US011217838B2

(12) United States Patent
Fairweather et al.

(10) Patent No.: US 11,217,838 B2
(45) Date of Patent: Jan. 4, 2022

(54) MANAGEMENT SYSTEM FOR COMMERCIAL ELECTRIC VEHICLES

(71) Applicant: SEA AUTOMOTIVE PTY LTD, Dandenong South (AU)

(72) Inventors: Tony Fairweather, Dandenong (AU); Warren Fairweather, Dandenong (AU)

(73) Assignee: SEA AUTOMOTIVE PTY LTD, Dandenong South (AU)

( * ) Notice: Subject to any disclaimer, the term of this patent is extended or adjusted under 35 U.S.C. 154(b) by 0 days.

(21) Appl. No.: 16/480,770

(22) PCT Filed: Apr. 18, 2017

(86) PCT No.: PCT/AU2017/050346
§ 371 (c)(1),
(2) Date: Jul. 25, 2019

(87) PCT Pub. No.: WO2018/136990
PCT Pub. Date: Aug. 2, 2018

(65) Prior Publication Data
US 2020/0001741 A1 Jan. 2, 2020

(30) Foreign Application Priority Data
Jan. 25, 2017 (AU) .................. 2017900220

(51) Int. Cl.
*H01M 10/63* (2014.01)
*B60L 58/24* (2019.01)
(Continued)

(52) U.S. Cl.
CPC .............. *H01M 10/63* (2015.04); *B60L 7/10* (2013.01); *B60L 15/2009* (2013.01);
(Continued)

(58) Field of Classification Search
None
See application file for complete search history.

(56) References Cited

U.S. PATENT DOCUMENTS 6,624,615 B1 9/2003 Park
2003/0171828 A1* 9/2003 Capps ................. H02J 13/0003
700/22

(Continued)

FOREIGN PATENT DOCUMENTS

CN 203854591 U 10/2014
JP 2012080630 A 4/2012
JP 2014125098 A 7/2014

OTHER PUBLICATIONS

Japanese Patent Application No. 2018-530123, Office Action dated Feb. 3, 2020, 12 pages.
(Continued)

*Primary Examiner* — Tamara L Weber
(74) *Attorney, Agent, or Firm* — Kilpatrick Townsend & Stockton LLP

(57) ABSTRACT

A management system for a commercial electric vehicle (EV), comprising: a controller area network (CAN) comprising a plurality of CAN buses connected to a plurality of components of the EV; and a vehicle controller connected to the CAN and configured to monitor and/or control the plurality of components of the EV based on CAN signals; wherein the plurality of CAN buses and their respective components comprise: a drive CAN bus connected to a motor controller system; a battery CAN bus connected to a battery system; and a telematics CAN bus connected to a telematics system.

18 Claims, 12 Drawing Sheets

(51) Int. Cl.
  *B60L 7/10* (2006.01)
  *B60L 15/20* (2006.01)
  *H01M 10/42* (2006.01)

(52) U.S. Cl.
  CPC ......... *B60L 58/24* (2019.02); *H01M 10/4257* (2013.01); *B60L 2240/423* (2013.01); *B60L 2240/545* (2013.01); *B60L 2240/547* (2013.01); *H01M 2010/4271* (2013.01); *H01M 2220/20* (2013.01)

(56) References Cited

U.S. PATENT DOCUMENTS

| | | | | |
|---|---|---|---|---|
| 2011/0116950 | A1* | 5/2011 | Niwa | H02K 11/33 417/410.1 |
| 2012/0168140 | A1* | 7/2012 | Yokkoyama | B60L 1/003 165/271 |
| 2013/0173111 | A1* | 7/2013 | Syed | B60W 50/14 701/36 |
| 2013/0197733 | A1* | 8/2013 | Zeng | B60W 30/18118 701/22 |
| 2015/0100226 | A1 | 4/2015 | Skaff et al. | |
| 2015/0274098 | A1* | 10/2015 | Bolger | B60R 16/033 307/10.6 |
| 2016/0046300 | A1 | 2/2016 | Wingfield et al. | |
| 2016/0093216 | A1 | 3/2016 | Lee et al. | |
| 2017/0126428 | A1* | 5/2017 | Paryani | G05B 15/02 |
| 2017/0334437 | A1* | 11/2017 | Mikami | B60K 6/448 |
| 2018/0079318 | A1* | 3/2018 | Ha | B60L 58/12 |
| 2018/0201152 | A1* | 7/2018 | Newman | H02J 7/35 |

OTHER PUBLICATIONS

International Patent Application No. PCT/AU2017/050346, International Search Report and Written Opinion dated Jul. 19, 2017, 9 pages.
International Patent Application No. PCT/AU2017/050346, International Preliminary Report on Patentability dated Feb. 21, 2018, 16 pages.
Canadian Patent Application No. 3,048,250, Office Action dated Apr. 21, 2020, 6 pages.
European Patent Application No. 17894498.9 , Extended European Search Report dated Oct. 7, 2020, 8 pages.
Can bus—Why Are There Multiple CAN Buses in Vehicles?, Motor Vehicle Maintenance & Repair Stack Exchange, Available Online at: https://mechanics.stackexchange.com/questions/26125/why-are-there-multiple-can-buses-in-vehicles, Feb. 16, 2016, pp. 1-7.
Albert et al., Migration from CAN to TTCAN for a Distributed Control System, ICC, CAN in Automation, Available Online at: https://www.can-cia.org/fileadmin/resources/documents/proceedings/2003_albert2.pdf, May 11, 2003, pp. 05-9-05-16.
European Application No. 17894498.9, Office Action dated Sep. 24, 2021, 7 pages.

* cited by examiner

MANAGEMENT SYSTEM FOR COMMERCIAL ELECTRIC VEHICLES

FIELD

The present invention relates to a management system for commercial electric vehicles (EVs).

BACKGROUND

Commercial EVs, such as heavy duty electric trucks and vans, comprise numerous main and auxiliary components including electric motors, batteries, inverters, air compressors, cooling pumps, power steering pumps, radiator fans, etc. The efficient and safe packaging of these components into integrated power packs for commercial EVs is described in Australian provisional patent application AU 2016900910 by the applicant of the present application. This application is hereby incorporated by reference.

A need exists for fully integrated systems to monitor and manage all aspects of the operation and performance of heavy duty commercial EVs to increase fleet efficiency, reduce operating costs, and improve driver safety.

SUMMARY

According to the present invention, there is provided a system, comprising:

a controller area network (CAN) comprising a plurality of CAN buses connected to a plurality of components of an electric vehicle (EV); and a vehicle controller connected to the CAN and configured to monitor and/or control the plurality of components of the EV based on CAN signals;

wherein the plurality of CAN buses and their respective components comprise:

a drive CAN bus connected to a motor controller system;
a battery CAN bus connected to a battery system; and
a telematics CAN bus connected to a telematics system.

The motor controller system may comprise a motor controller connected to an electric motor, wherein the vehicle controller is configured to control torque of the electric motor to prevent rollback to thereby maintain position of the EV when in drive with brake applied.

The vehicle controller may be further configured to control regenerative braking by determining if the EV is coasting and adjusting a regeneration current supplied by the electric motor to a high-voltage (HV) battery of the EV.

The vehicle controller may be further configured to measure operating temperature of the motor controller and adjust speeds of a cooling pump and a radiator fan to maintain a predetermined operating temperature.

The vehicle controller may be further configured to determine an application rate of an accelerator pedal of the EV and monitor power supplied by the motor controller to optimise and report on driving efficiency of a driver of the EV.

The battery system may comprise a battery management system (BMS) connected to the HV battery, wherein the vehicle controller is configured to monitor battery temperature and optimise current supplied to the HV battery based on the battery temperature.

The vehicle controller may be further configured to monitor a state of battery contactors of the HV battery and optimise an amount of time required to start the EV.

The BMS may comprise a HV power distribution box configured to selectively activate and deactivate a plurality of auxiliary components of the EV to optimise efficiency of the EV.

The plurality of auxiliary components may comprise the motor controller, a HV heater in a cabin of the EV, a HV air conditioning (AC) compressor, an air compressor, a power steering pump, a HV charger, and combinations thereof.

The telematics system may be configured to collect and analyse a plurality of parameters relating to the EV, a driver of the EV, or both.

The plurality of parameters may comprise acceleration, braking, cornering, battery regeneration, cabin temperature, speed, payload delivery, delivery route, delivery time, diagnostics, repair, maintenance, and combinations thereof.

The telematics system may be further configured to communicate the plurality of parameters to a computing device comprising a vehicle entertainment system, a desktop computer, a laptop computer, a tablet computer, a smartphone, and combinations thereof.

The telematics system may be further configured to generate a dashboard on the computing device displaying the plurality of parameters.

The HV heater may be configured to:
optimise activation of heater elements based on environmental and user conditions;
isolate itself from HV power in case of a fault condition; and
adjust fluid in/out temperature based on environmental and user conditions.

The HV AC compressor may be configured to:
optimise activation of heater elements based on environmental and user conditions;
isolate itself from HV power in case of a fault condition; and
adjust fluid in/out temperature based on environmental and user conditions.

The cooling pump may be configured to have a variable speed based on inputs from low-voltage (LV) controls to optimise efficiency of the EV.

The radiator fan may be configured to have a variable speed based on inputs from the LV controls to optimize efficiency of the EV.

The battery system may further comprise a HV charger, and wherein the vehicle controller is configured to evaluate operating conditions of the EV through the CAN and control the HV charger to optimise power supplied by HV direct current (DC) to charge the HV battery.

The present invention also provides a method of operating an EV using the system described above.

The present invention further provides an EV comprising the system described above.

BRIEF DESCRIPTION OF DRAWINGS

Embodiments of the invention will now be described by way of example only with reference to the accompanying drawings, in which.

DESCRIPTION OF EMBODIMENTS

Figure 1:
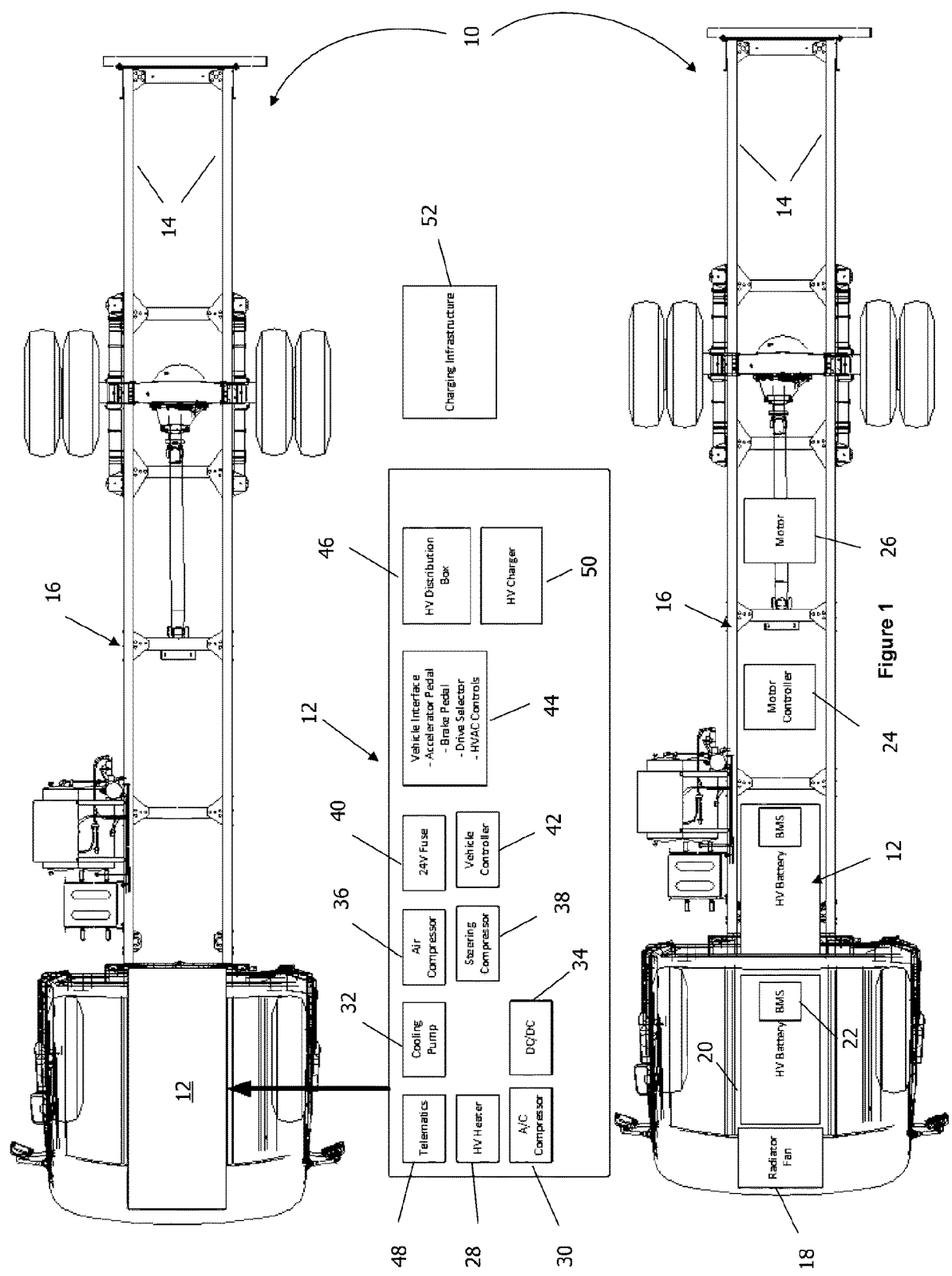
FIG. 1 is a functional block diagram of an electrical system of an EV according to an embodiment of the present invention.

Referring to FIG. 1, a commercial EV 10 generally comprises an electric power pack 12 configured to closely fit between an opposed pair of frame rails 14 of a chassis 16 of a commercial vehicle. The commercial vehicle may be a mid- or front-engine commercial vehicle comprising, for example, a van, a bus, or a truck. Further, the commercial vehicle may be a glider to be converted into a new commercial EV 10, or a diesel or petrol commercial vehicle to be converted or retrofitted to electric power. The electric power pack 12 may configured generally as described in Australian provisional patent application AU 2016900910.

More specifically, the electric power pack 12 may comprise main and auxiliary components of the EV 10 including a radiator fan 18, a HV battery 20, a BMS 22, a motor controller (or microcontroller unit (MCU)) 24, an electric motor 26, a HV heater 28, a HV AC compressor 30, a cooling pump 32, a DC/DC converter 34, an air compressor 36, a steering compressor 38, 24 V fuses 40, a vehicle controller (or vehicle management unit (VMU)) 42, vehicle interfaces 44 (eg, accelerator pedal, brake pedal, drive selector, heating ventilation and air conditioning (HVAC) controls, etc), a HV power distribution box 46, a telematics system 48, and a HV charger 50 connectable to charging infrastructure 52.

Figure 2:
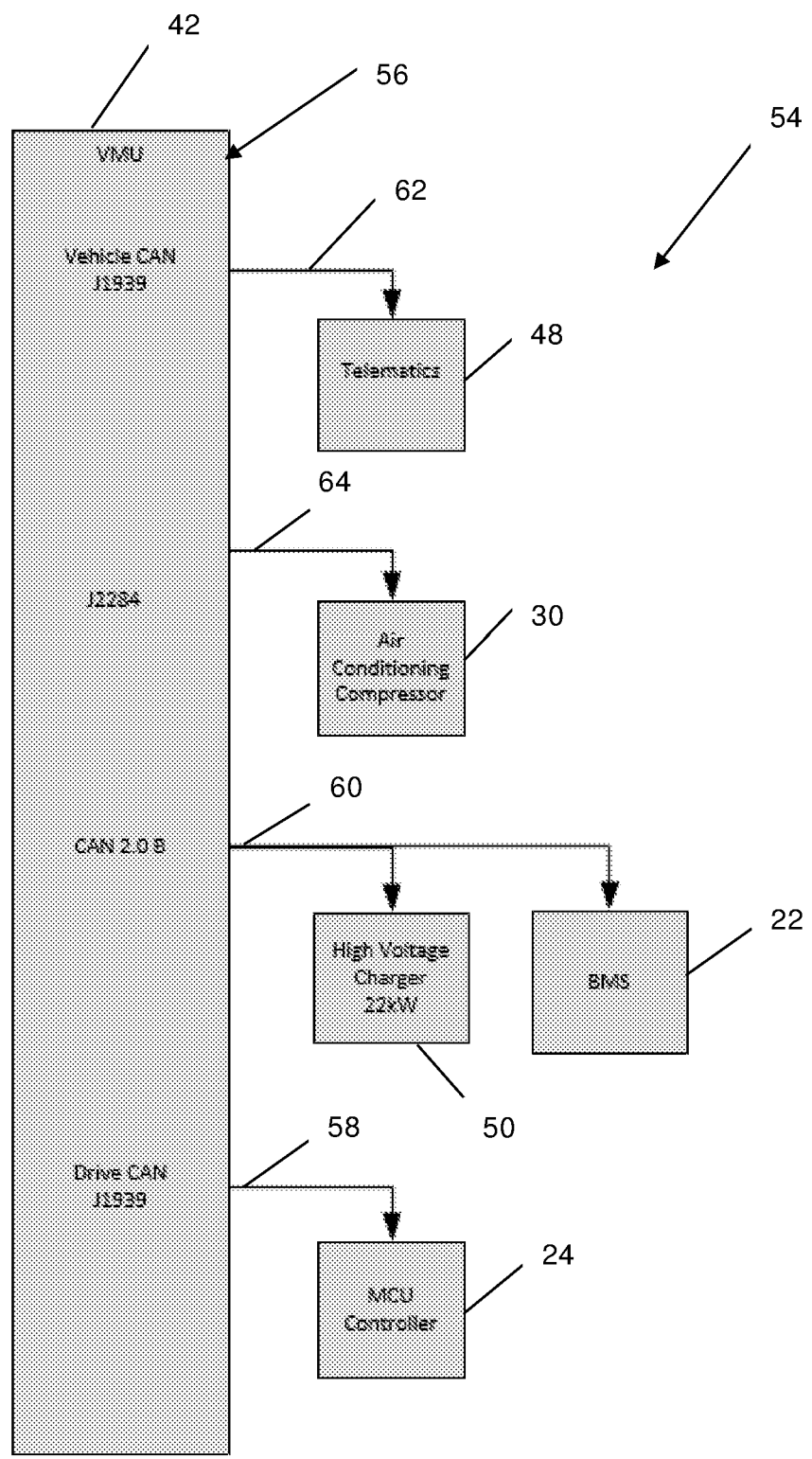
FIG. 2 is a functional block diagram of a CAN architecture of a management system of the EV.
Figure 3:
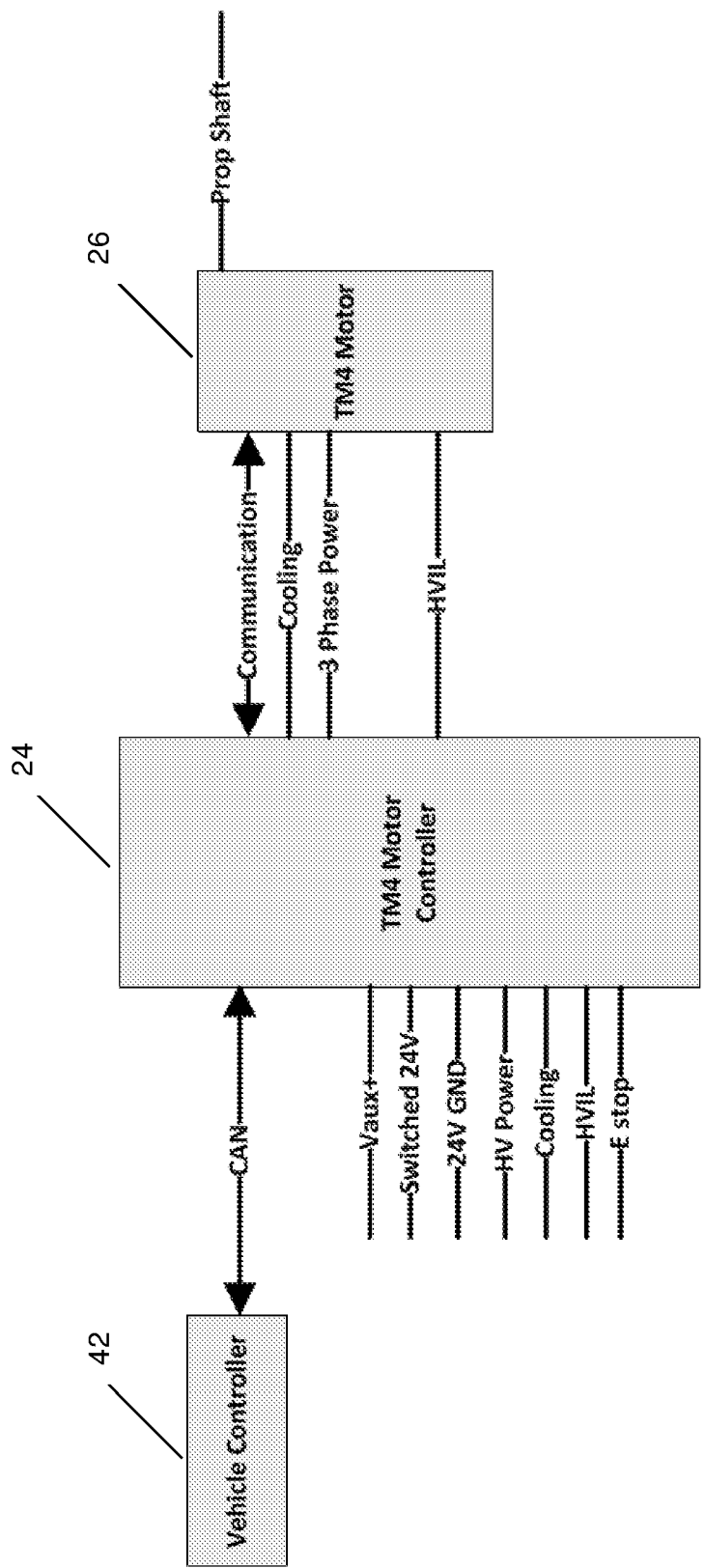
FIG. 3 is a functional block diagram of a drive controller system of the EV.
Figure 4:
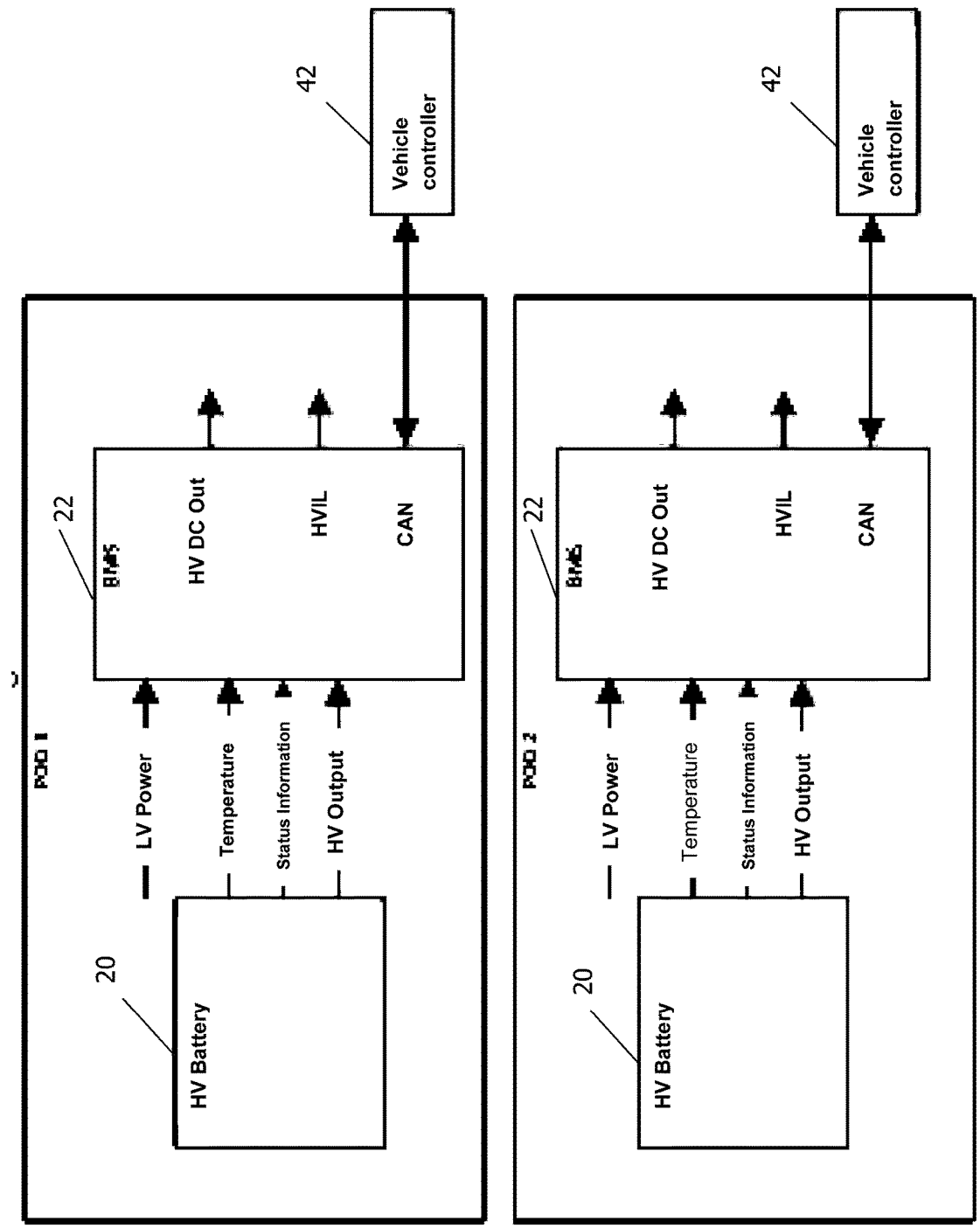
FIG. 4 is a functional block diagram of a battery system of the EV.
Figure 5:
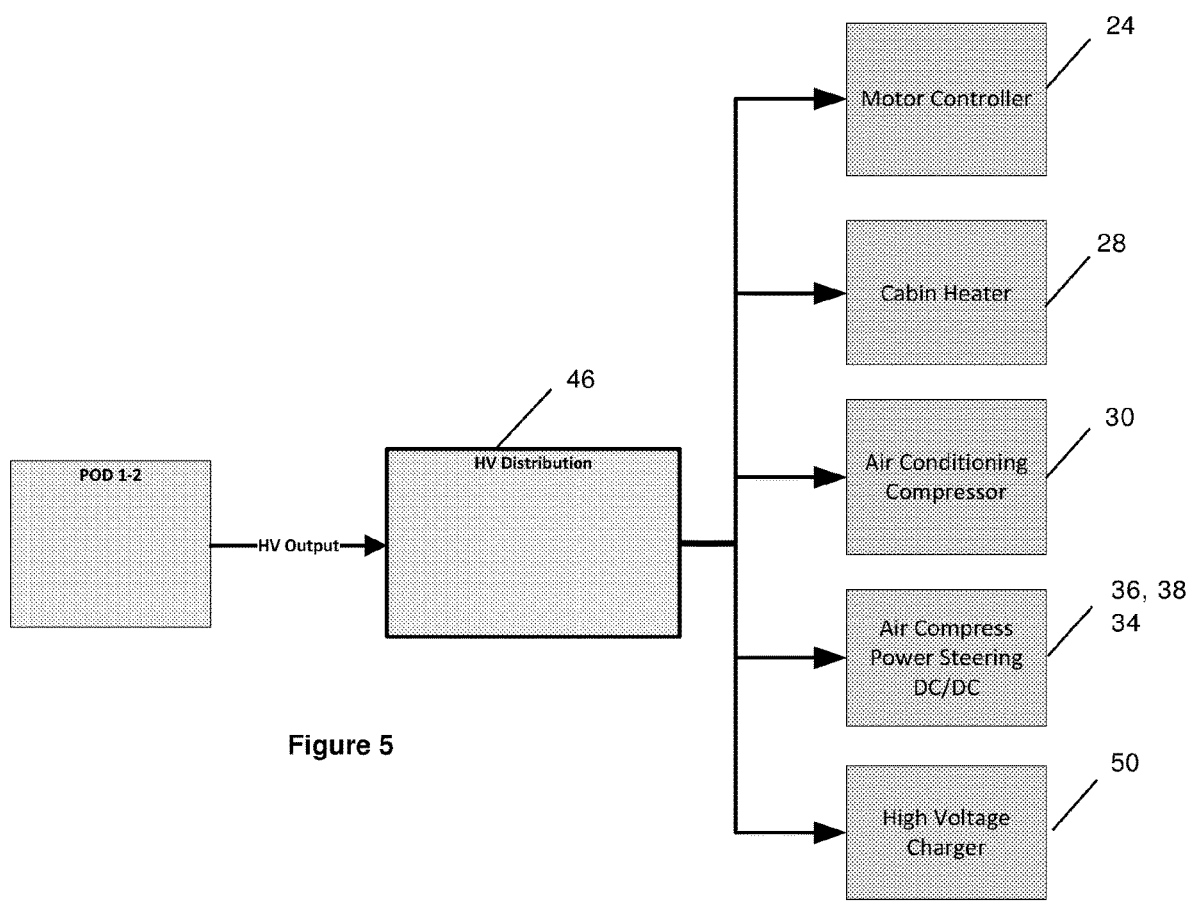
FIG. 5 is a functional block diagram of a HV power distribution box of the EV.
Figure 6:
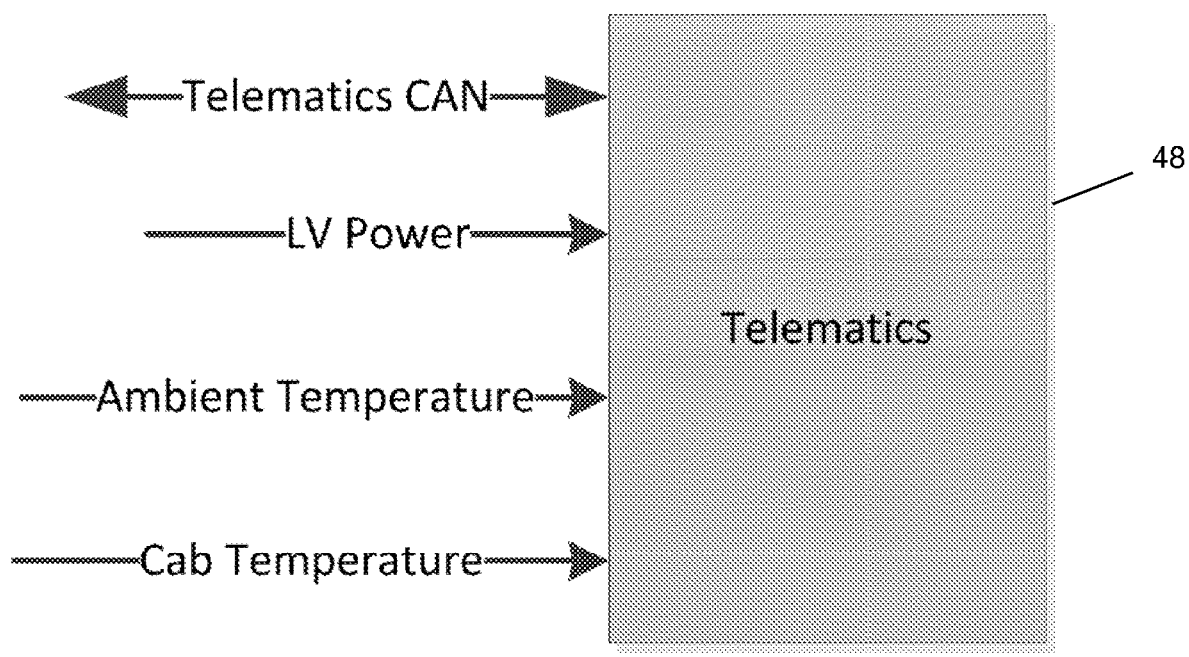
FIG. 6 is a functional block diagram of a battery system of the EV.

FIG. 2 illustrates a CAN architecture of a management system 54 for the EV 10. The CAN 56 may comprise a plurality of CAN buses connected to the main and auxiliary components of the electric power pack 12 described above of the EV 10. The CAN buses may comprise a drive CAN bus 58, a battery CAN bus 60, and a telematics CAN bus 62. The HV AC compressor 30 may also be connected to the CAN 56 by a further CAN bus 64. The vehicle controller 42 may be connected to the CAN 56 and configured to monitor and/or control the plurality of components of the EV 10 based on CAN signals. Each of the components can be connected to their respective CAN buses at CAN nodes. Each CAN node may be configured as an input/output device or as an embedded computer or controller with a CAN interface and software. Sensors (not shown) may be associated with or embedded in the components may also be connected to the CAN buses at CAN nodes.

The drive CAN bus 58 may be connected to a motor controller system that comprises the motor controller 24 and the electric motor 26. The vehicle controller 42 may be configured to control torque of the electric motor 26 to prevent rollback to thereby maintain position of the EV 10 when in drive with brake applied. The vehicle controller 42 may be further configured to control regenerative braking by determining if the EV 10 is coasting and adjusting a regeneration current supplied by the electric motor 26 to the HV battery 20 of the EV 10. The vehicle controller 42 may be further configured to measure operating temperature of the motor controller 24 and adjust speeds of the cooling pump 32 and the radiator fan 18 to maintain a predetermined operating temperature. The vehicle controller 42 may be further configured to determine an application rate of an accelerator pedal 44 of the EV 10 and monitor power supplied by the motor controller 24 to optimise and report on driving efficiency of a driver of the EV 10.

The battery CAN bus 60 may be connected to a battery system that comprises the BMS 22 and the HV battery 20. The vehicle controller 42 may be configured to monitor battery temperature and optimise current supplied to the HV battery 20 based on the battery temperature. The vehicle controller 42 may be further configured to monitor a state of battery contactors of the HV battery 20 and optimise an amount of time required to start the EV 10. The BMS 22 may comprise the HV power distribution box 46 that is configured to selectively activate and deactivate a plurality of auxiliary components of the EV 10 to optimise operating efficiency of the EV 10. The plurality of auxiliary components may comprise the motor controller 24, the HV heater 28, the HV AC compressor 30, the air compressor 36, the power steering pump 38, the HV charger 50, and combinations thereof.

Figure 7:
FIG. 7 is a screenshot of a dashboard of operational/performance parameters of the EV generated by the telematics system of the management system.

The telematics CAN bus 62 may be connected to the telematics system 48 that is configured to collect and analyse a plurality of parameters relating to the EV 10, a driver of the EV 10, or both. The plurality of parameters may comprise acceleration, braking, cornering, battery regeneration, cabin temperature, speed, payload delivery, delivery route, delivery time, diagnostics, repair, maintenance, and combinations thereof. The telematics system may be further configured to communicate the plurality of parameters to a computing device comprising a vehicle entertainment system, a desktop computer, a laptop computer, a tablet computer, a smartphone, and combinations thereof. Referring to FIG. 7, the telematics system 48 may be further configured to generate a dashboard (or graphical user interface) 66 on the computing device displaying one or more of the plurality of operational and/or performance parameters.

The telematics system may implement and embody a "TDDR" principal as follows:

(T)ruck=commercial EV 10 diagnostics and operational optimisation displayed through an online dashboard. This vehicle diagnostics tool will allow both proactive and reactive vehicle monitoring, diagnostics and repair. An example being the proactive reporting of a vehicle LED light failure prior to the EV 10 returning to the depot, so maintenance crews are prepared to repair the vehicle when it returns.

(D)river=telemetry to optimise driver interaction with the commercial EV 10, and subsequently optimise vehicle performance. It has been proven in global studies that a driver can have up to 15% impact on the overall performance of an EV, hence monitoring driver interaction with the commercial EV 10 (and subsequently having the ability to reward good driver performance), is a key benefit of the telematics system. Operational/performance parameters that may be monitored include acceleration, braking, cornering, battery regeneration, cab temperatures and speed.

(D)elivery=ability to interface the "Smart Truck" with payload deliveries and receiver communication. An enormous opportunity to reduce the substantial cost of missed deliveries for a vast range of reasons. A development intention being to allow the vehicle to proactively communicate intended delivery times to home deliveries, and allowing the receiver to respond (by smartphone response) confirmation of that time, a proposed new time or authorising the driver to leave the consignment in a particular location. The assurance of a delivery providing a dramatic reduction in cost-per-consignment for the operator for an issue that is a proven, growing (due to increased online shopping activity) and expensive issue in Australia and other widely geographically-dispersed markets.

(R)oute=relates to the importance of route data collection for route planning and real-time optimisation. With daily delivery route profiles changing periodically, route planning is a critical function of optimised service delivery. Data collection is key to this function, so ensuring that the telematics system of the management system 54 can continuously collect route data, so that both periodical and real-time route optimisation can be performed, is critical. An example may be a home delivery receiver requesting a changed delivery time in advance, requiring the vehicle to vary its current scheduled route to a more efficient route allowing all required deliveries and collections still to be made that particular day.

Currently, there is no global provider of integrated telemetry that offers this full suite of data collection and analysis for commercial EVs. With all four aspects of TDDR analysis optimised, a benchmark level of operational and service performance may be provided. Real time (in-vehicle) software updates, ensure each vehicle utilising the telematics functionality of the management system 54 has the most recent software and is continuously diagnosing improvements.

Figure 8:
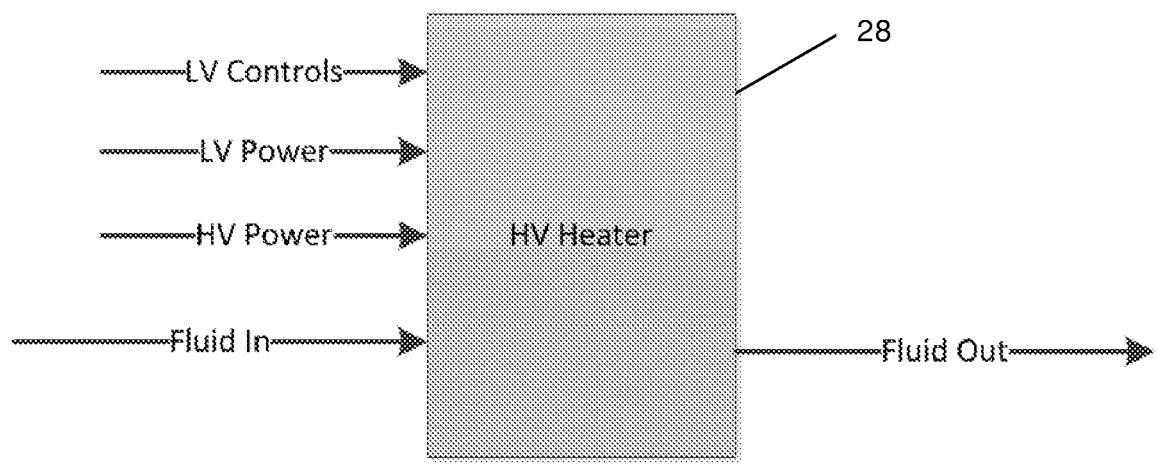
FIG. 8 is a functional block diagram of a HV heater of the EV.

FIGS. 8 to 15 illustrate components of the electrical system of the EV 10 and their integration in the management system 54. Referring to FIG. 8, the HV heater 28 may be configured to: optimise activation of heater elements based on environmental and user conditions; isolate itself from HV power in case of a fault condition; and adjust fluid in/out temperature based on environmental and user conditions.

Figure 9:
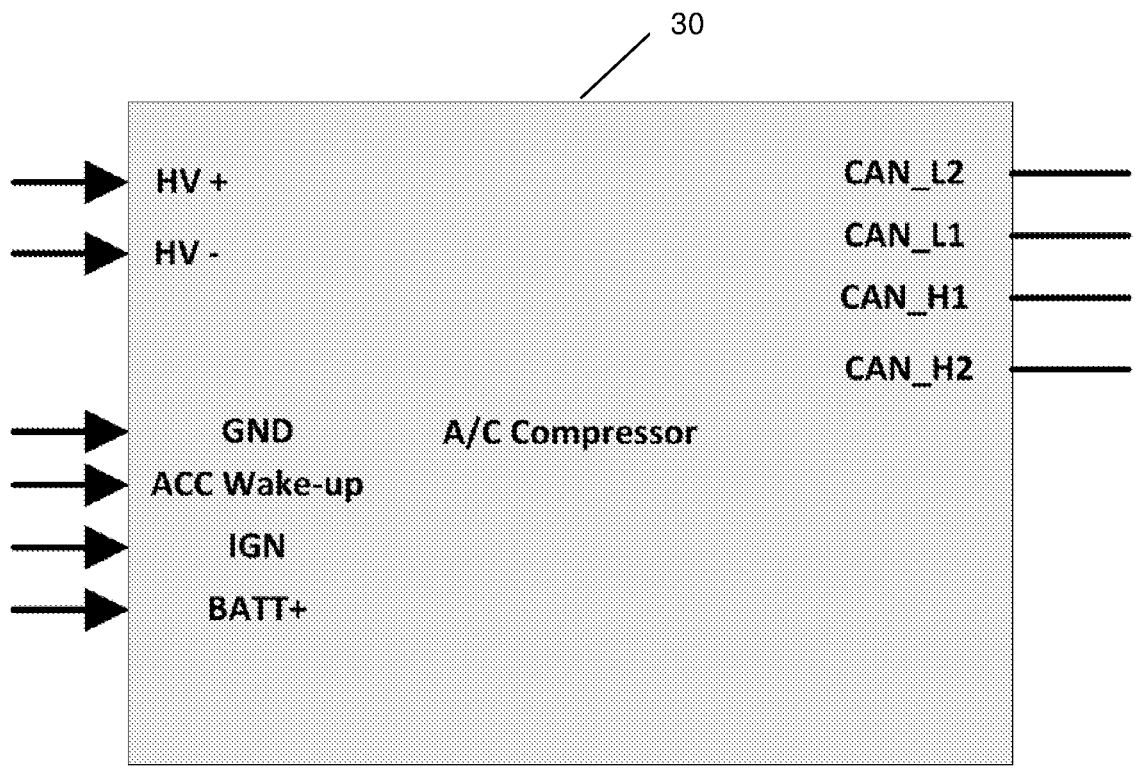
FIG. 9 is a functional block diagram of an AC compressor of the EV.

Similarly, as illustrated in FIG. 9, the HV AC compressor 36 may be configured to: optimise activation of heater elements based on environmental and user conditions; isolate itself from HV power in case of a fault condition; and adjust fluid in/out temperature based on environmental and user conditions.

Figure 10:
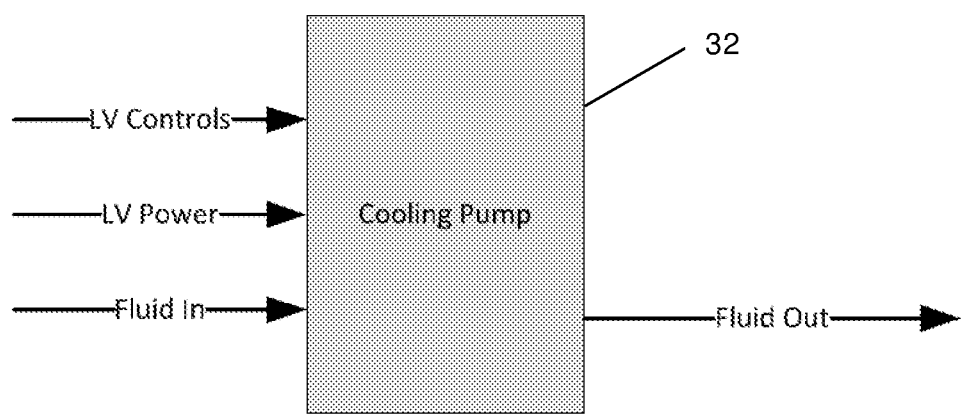
FIG. 10 is a functional block diagram of a cooling pump of the EV.

Referring to FIG. 10, the cooling pump 32 may be configured to have a variable speed based on inputs from LV controls to optimise efficiency of the EV 10. The cooling pump 32 may be further configured to have a variable speed based on inputs from the LV controls to optimise efficiency of the EV 10.

Figure 11:
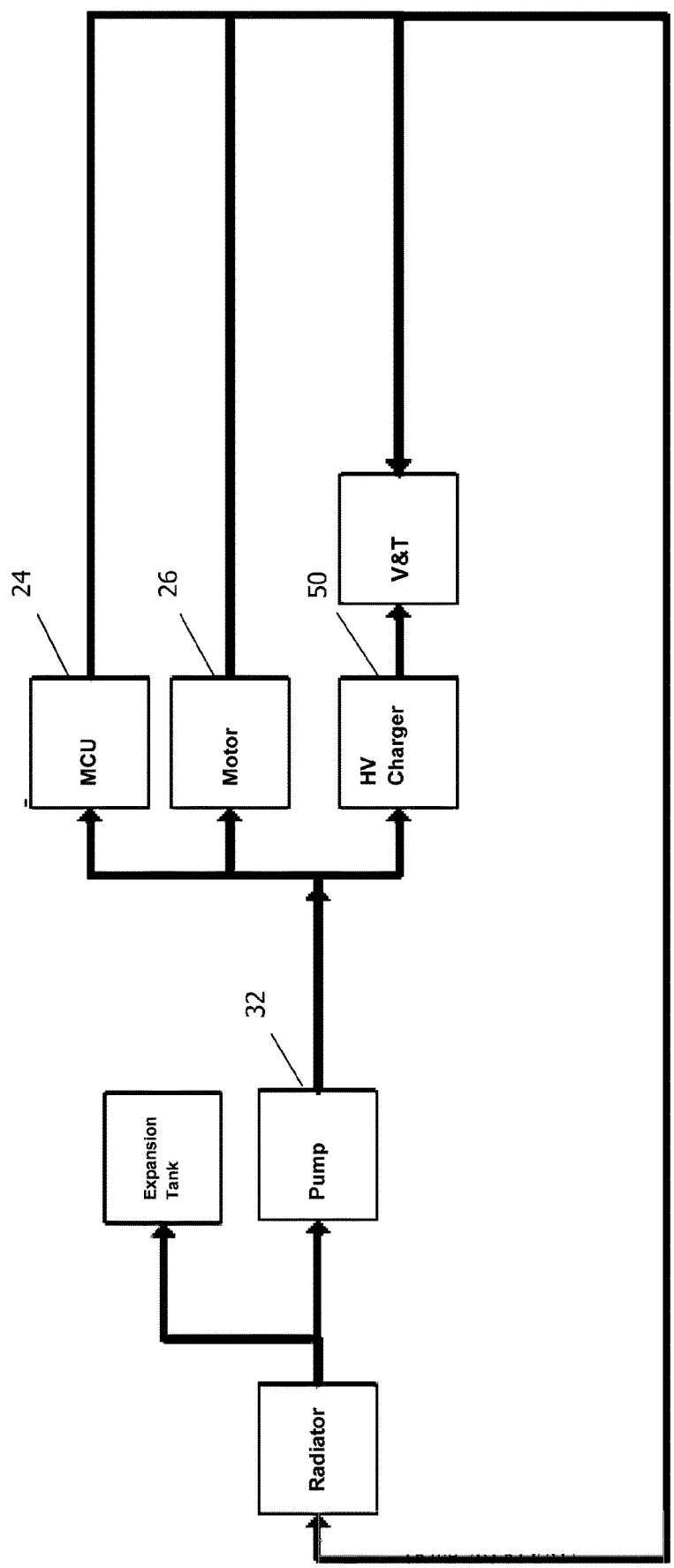
FIG. 11 is a functional block diagram of a cooling loop architecture of the EV.

FIG. 11 illustrates a cooling loop architecture of the EV 10. The cooling configuration provided by the cooling loop provides optimised series/parallel cooling system for vehicle level electrical components, including the motor controller 24, electric motor 26 and HV charger 50.

Figure 12:
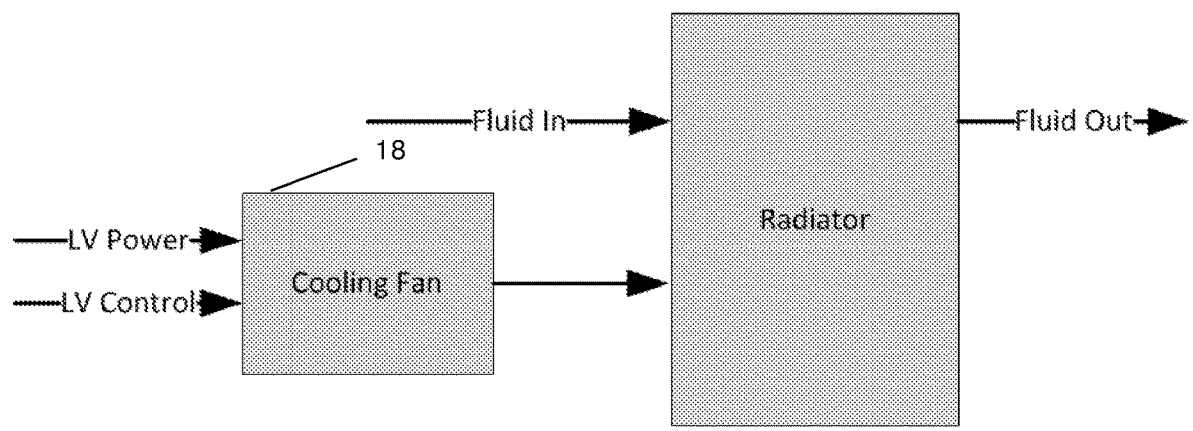
FIG. 12 is a functional block diagram of a cooling fan of the EV.
Figure 13:
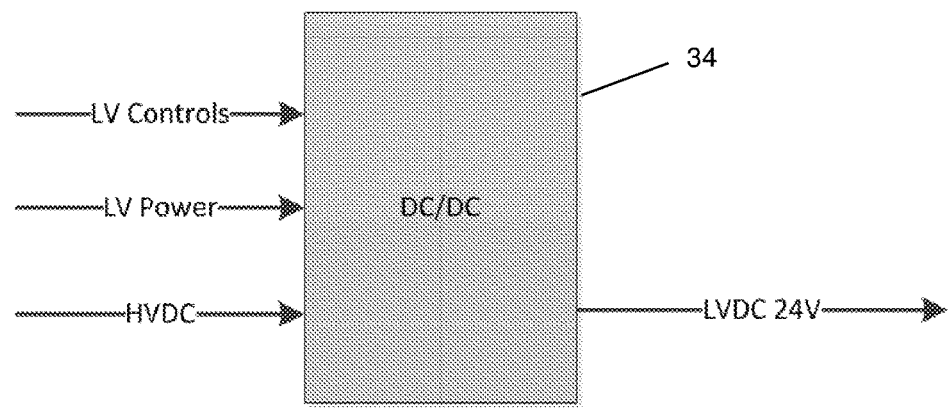
FIG. 13 is a functional block diagram of a DC/DC inverter of the EV.

FIGS. 12 and 13 respectively illustrate example functional implementations of the cooling fan 18 and the DC/DC inverter 34 in the EV 10.

Figure 14:
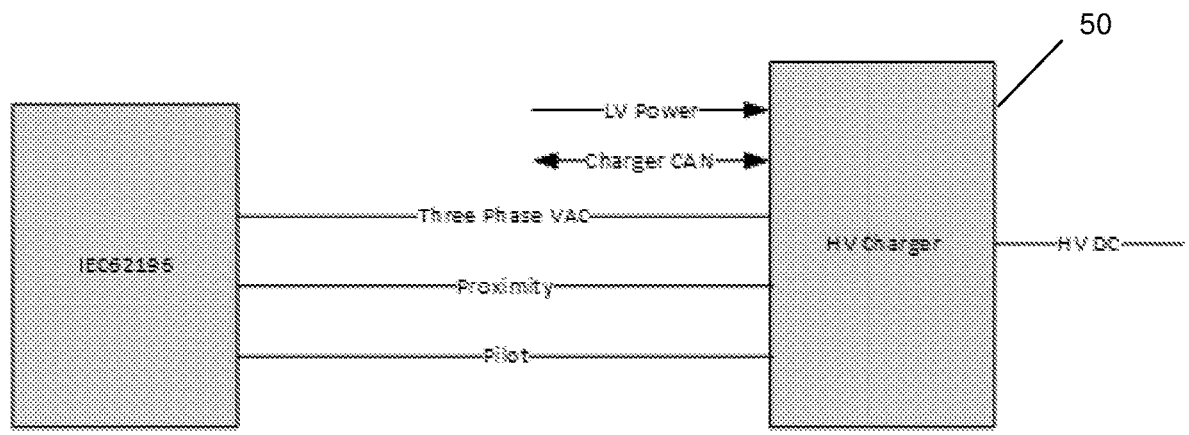
FIGS. 14 and 15 are functional block diagrams HV charger of the EV.
Figure 15:
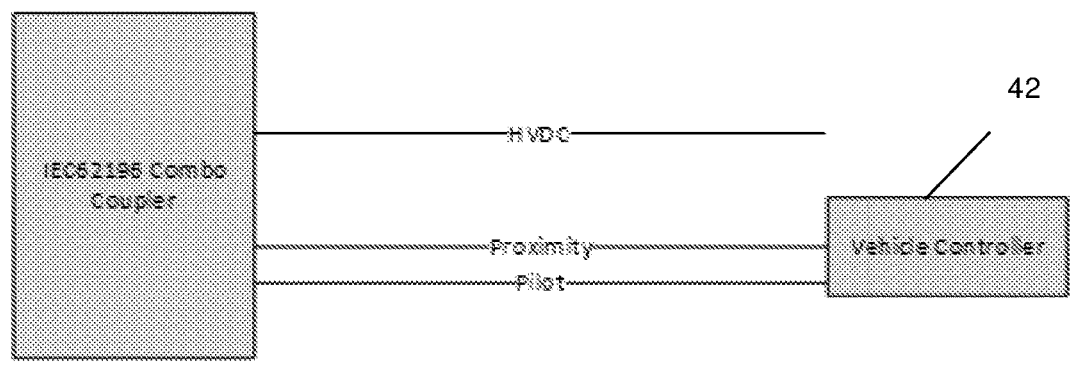

Referring to FIGS. 14 and 15, the vehicle controller 42 may be configured to evaluate operating conditions of the EV 10 through the CAN 56 and control the control the HV charger 50 to optimise power supplied by HV direct current (DC) to charge the HV battery 20.

Embodiments of the present invention provide fully integrated monitoring, management and telematics systems for commercial EVs that are useful to increase fleet efficiency, reduce operating costs, and improve driver safety.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A management system for a commercial electric vehicle (EV), comprising:
  a controller area network (CAN) comprising a plurality of separate CAN buses, each of the separate CAN buses connected to a plurality of components of the EV; and
  a vehicle controller connected to the CAN and configured to monitor and/or control the plurality of components of the EV based on CAN signals;
  wherein the plurality of separate CAN buses and their respective components comprise:
    a drive CAN bus connected to a motor controller system comprising a high-motor controller connected to an electric motor; and
    a battery CAN bus, separate from the drive CAN bus, connected to a battery system comprising a high-voltage (HV) battery and isolated from the motor controller system; and
    a telematics CAN bus, separate from both the drive CAN bus and the battery CAN bus, connected to a telematics system and disconnected from both the HV battery and the motor controller system;
  wherein the vehicle controller is further configured to:
    measure operating temperature of the motor controller and adjust speed of a cooling pump and a radiator fan to maintain a predetermined operating temperature; and
    monitor a state of battery contactors of the HV battery and optimize an amount of time required to start the EV.

2. The management system of claim 1, wherein the vehicle controller is configured to control torque of the electric motor to prevent rollback to thereby maintain position of the EV when in drive with brake applied.

3. The management system of claim 2, wherein the vehicle controller is further configured to control regenerative braking by determining if the EV is coasting and adjusting a regeneration current supplied by the electric motor to the HV battery of the EV.

4. The management system of claim 3, wherein the vehicle controller is further configured to determine an application rate of an accelerator pedal of the EV and monitor power supplied by the motor controller to optimise and report on driving efficiency of a driver of the EV.

5. The management system of claim 4, wherein the battery system further comprises a HV charger, and wherein the vehicle controller is configured to evaluate operating conditions of the EV through the CAN and control the HV charger to optimise power supplied by HV direct current (DC) to charge the HV battery.

6. The management system of claim 1, wherein the battery system comprises a battery management system (BMS)

connected to the HV battery, and wherein the vehicle controller is configured to monitor battery temperature and optimise current supplied to the HV battery based on the battery temperature.

7. The management system of claim 1, wherein the telematics system is configured to collect and analyse a plurality of parameters relating to the EV, a driver of the EV, or both.

8. The management system of claim 7, wherein the plurality of parameters comprise acceleration, braking, cornering, battery regeneration, cabin temperature, speed, payload delivery, delivery route, delivery time, diagnostics, repair, maintenance, and combinations thereof.

9. The management system of claim 8, wherein the telematics system is further configured to communicate the plurality of parameters to a computing device comprising a vehicle entertainment system, a desktop computer, a laptop computer, a tablet computer, a smartphone, and combinations thereof.

10. The management system of claim 9, wherein the telematics system is further configured to generate a dashboard on the computing device displaying the plurality of parameters.

11. The management system of claim 1, wherein the cooling pump is configured to have a variable speed based on inputs from low-voltage (LV) controls to optimise efficiency of the EV.

12. The management system of claim 11, wherein the radiator fan is configured to have a variable speed based on inputs from the LV controls to optimise efficiency of the EV.

13. A method of operating an EV using the management system of claim 1.

14. An EV, comprising the management system of claim 1.

15. The management system of claim 1, wherein the battery system comprises a battery management system (BMS) and the BMS comprises a HV power distribution box configured to selectively activate and deactivate a plurality of auxiliary components of the EV to optimise efficiency of the EV.

16. The management system of claim 15, wherein the plurality of auxiliary components comprise the motor controller, a HV heater in a cabin of the EV, a HV air conditioning (AC) compressor, an air compressor, a power steering pump, a HV charger, and combinations thereof.

17. The management system of claim 16, wherein the HV heater is configured to:
optimise activation of heater elements based on environmental and user conditions;
isolate itself from HV power in case of a fault condition; and
adjust fluid in/out temperature based on environmental and user conditions.

18. The management system of claim 16, wherein the HV AC compressor is configured to:
optimise activation of heater elements based on environmental and user conditions;
isolate itself from HV power in case of a fault condition; and
adjust fluid in/out temperature based on environmental and user conditions.

* * * * *